(12) United States Patent
Lamoine et al.

(10) Patent No.: US 8,820,467 B2
(45) Date of Patent: Sep. 2, 2014

(54) ENGINE FRAME FOR AN ELECTRIC ENGINE OF A MOTOR VEHICLE

(75) Inventors: Patrick Lamoine, Montigny le Bretonneux (FR); Michael Grosjean, Ponthevrard (FR)

(73) Assignee: Renault S.A.S., Boulogne Billancourt (FR)

( * ) Notice: Subject to any disclaimer, the term of this patent is extended or adjusted under 35 U.S.C. 154(b) by 0 days.

(21) Appl. No.: 13/502,212

(22) PCT Filed: Sep. 21, 2010

(86) PCT No.: PCT/FR2010/051965
§ 371 (c)(1),
(2), (4) Date: Jun. 12, 2012

(87) PCT Pub. No.: WO2011/045497
PCT Pub. Date: Apr. 21, 2011

(65) Prior Publication Data
US 2012/0247863 A1     Oct. 4, 2012

(30) Foreign Application Priority Data
Oct. 15, 2009   (FR) ...................................... 09 57242

(51) Int. Cl.
*B60K 1/00* (2006.01)
*H02K 5/00* (2006.01)

(52) U.S. Cl.
CPC ................ *B60K 1/00* (2013.01); *Y02T 10/641* (2013.01); *H02K 5/00* (2013.01)

USPC .......................................... 180/299; 180/312

(58) Field of Classification Search
USPC ......................... 180/68.5, 291, 299, 311, 312
See application file for complete search history.

(56) References Cited

U.S. PATENT DOCUMENTS

| | | | | |
|---|---|---|---|---|
| 7,144,039 B2* | 12/2006 | Kawasaki et al. | ............. | 280/784 |
| 7,222,692 B2* | 5/2007 | Masuda | ........................ | 180/291 |
| 7,874,395 B2* | 1/2011 | Taji et al. | ....................... | 180/300 |
| 7,886,861 B2* | 2/2011 | Nozaki et al. | .................. | 180/232 |
| 2004/0159478 A1 | 8/2004 | Masuda | | |
| 2008/0078603 A1 | 4/2008 | Taji et al. | | |
| 2012/0055725 A1* | 3/2012 | Mizoguchi et al. | .......... | 180/68.5 |

FOREIGN PATENT DOCUMENTS

| | | |
|---|---|---|
| EP | 1 447 254 | 8/2004 |
| FR | 2 928 877 | 9/2009 |
| JP | 8 310252 | 11/1996 |

OTHER PUBLICATIONS

International Search Report Issued Jan. 17, 2011 in PCT/FR10/51965 Filed Sep. 21, 2010.

\* cited by examiner

*Primary Examiner* — John Walters
*Assistant Examiner* — Brian Swenson
(74) *Attorney, Agent, or Firm* — Oblon, Spivak, McClelland, Maier & Neustadt, L.L.P.

(57) ABSTRACT

Said device for mounting an electric propulsion assembly into the engine compartment of an electric vehicle includes a mounting member (4, 5) having a means for attaching onto the vehicle chassis and attachment means for an electrical machine (3), an electrical power unit (2), and a charging unit (1).

18 Claims, 3 Drawing Sheets

ENGINE FRAME FOR AN ELECTRIC ENGINE OF A MOTOR VEHICLE

BACKGROUND

The invention relates generally to the electric engines of motor vehicles, and relates more particularly to the mounting of the electric engine in the engine compartment of the motor vehicle.

In an electric vehicle, the electric engine generally comprises an electric machine, an electronic power block and a charger block. These three elements are not fastened to one another in order to form one assembly as is the case for heat-powered vehicles. Linking these elements to the chassis then poses a problem. This is because, at the mounting stage, this implies, at first glance, linking each element to the chassis which increases the complexity of the mounting, dismantling and maintenance operations.

BRIEF SUMMARY

The aim of the invention is therefore to overcome these drawbacks by proposing an engine frame and electric engine assembly in the form of a single block facilitating the handling and mounting in the engine compartment of the vehicle.

In one embodiment, a device for mounting an electric propulsion assembly in the engine compartment of an electric vehicle comprises a mounting member having fastening means on the chassis of the vehicle and fastening means for an electric machine, an electronic power block and a charger block. The fastening means on the mounting member are, for example, a stud and nut assembly.

The mounting member can be divided into two portions and comprise a bottom securing module, such as a bottom frame, provided with a means for fastening to the chassis, a means for fastening the electric machine and a means for fastening the electronic power block, and a top securing module, such as a top frame, provided with a means for fastening the charger block and designed to be fastened onto the bottom securing module. The bottom securing module is linked to the chassis by fastening means in order to allow dismantling from above. The weight of the power electronic unit is such that, in effect, it has to be removed by lifting when dismantling the engine.

Advantageously, the bottom securing module comprises two transversal beams on which two fastening means enable a first beam of the top module to be fastened substantially attached to a first transversal beam of the bottom module and a second beam of the top module situated at a distance from a second transversal beam of the bottom module. The lack of space in the engine compartment is such that the lateral beams of the top securing module have to be recentered, thus partly covering at least the electronic power unit.

Preferably, the bottom securing module comprises lifting arms arranged on either side of its center of gravity. This position facilitates the handling of the electric motor assembly and its subsequent mounting in the engine compartment of an electric vehicle.

Advantageously, the device comprises fastening means suitable for fastening the auxiliary elements of the engine, such as a compressor or a water pump, to the bottom securing module. Thus, it is possible to dismantle the three elements of the engine while leaving the auxiliary elements in place.

According to another aspect, an electric propulsion assembly, intended to be mounted in the engine compartment of an electric vehicle, comprises an electric machine, an electronic power block and a charger block in which a mounting member has fastening means on the chassis of the vehicle and fastening means for the electric machine, the electronic power block and the charger block.

Preferably, the mounting member comprises a bottom securing module, such as a bottom frame, provided with a means for fastening to the chassis, a means for fastening the electric machine and a means for fastening the electronic power block, and a top securing module, such as a top frame, provided with a means for fastening the charger block and designed to be fastened to the bottom securing module. This assembly is then intended to be mounted in the engine compartment of an electric vehicle. The duly formed assembly can be conveyed in the various vehicle assembly factories.

According to yet another aspect, a method for mounting an electric propulsion assembly in the engine compartment of an electric vehicle comprises the following steps: an electric machine is fastened onto the bottom portion of a bottom securing module; an electronic power block is fastened onto the top portion of the bottom securing module; a charger block is fastened onto a top securing module; the top securing module is fastened onto the bottom securing module. Finally, the assembly is housed inside the engine compartment by advantageously fastening the bottom securing module to the chassis of the vehicle. Dismantling is then done in reverse. The first step is to remove the charger block, then the top securing module, making access to the electronic power unit possible, then the electric machine.

Preferably, auxiliary elements of the engine, such as a compressor or a water pump, are fastened to the bottom securing module.

BRIEF DESCRIPTION OF THE DRAWINGS

Other aims, features and advantages of the invention will become apparent from reading the following description, given solely as a nonlimiting example, and with reference to the appended drawings, in which.

DETAILED DESCRIPTION

Figure 1:
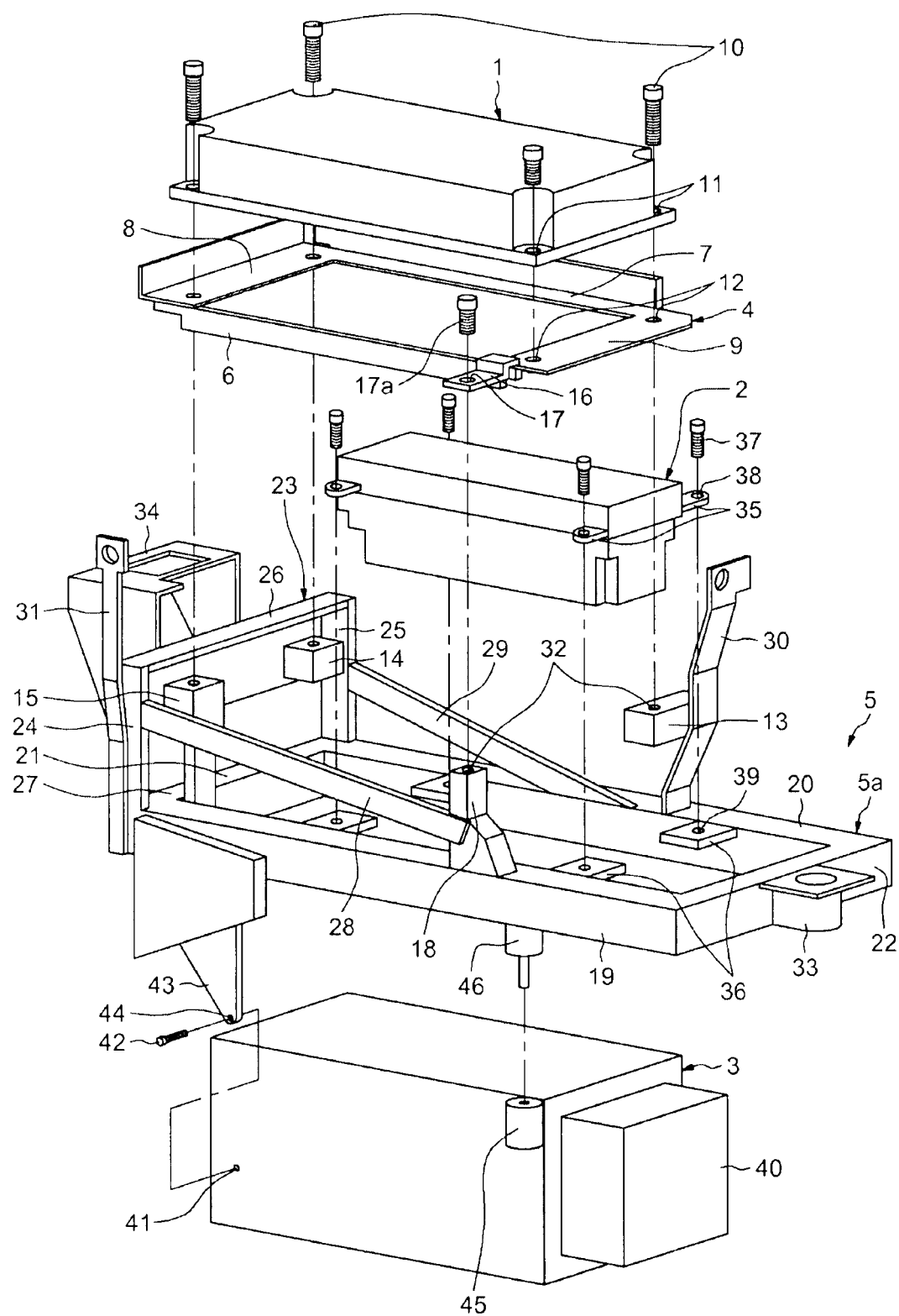
FIG. 1 illustrates an exploded view of a device according to the invention.

FIG. 1 shows a mounting device in exploded view for an electric propulsion assembly according to the invention. The propulsion assembly comprises a charger block 1, an electronic power unit 2, and an electric machine 3. These different elements of the propulsion assembly are fastened onto a mounting device comprising a mounting member consisting of a top frame 4 and a bottom frame 5. The top frame 4 is, in the example illustrated, substantially rectangular. It has two longitudinal beams 6 and 7 and two transversal beams 8 and 9. Conventionally, in the present description, the front portion of the device corresponds to the portion situated on the left of the figure and the rear portion is defined as being the portion situated on the right of the figure. Thus, the transversal beam 8 will hereinafter be called the "front" beam and the transversal beam 9 the "rear" beam of the top frame 4.

The parallelepipedal charger block 1 is fastened onto the top frame 4 by four screws 10 passing through four orifices 11 situated in the vicinity of its corners and four corresponding orifices 12 situated in the vicinity of the four corners of the top frame 4. Three of these screws 10 are fastened onto three fastening elements 13, 14, 15 situated on the bottom frame 5, thus enabling the charger block 1 to be fastened to the top frame 4 and the top frame 4 to the bottom frame 5. The remaining screw is fastened, for example using a nut, in an orifice 12 of the top frame 4, thus creating a means for fastening the charger block 1 to the top frame 4. The top frame 4 also comprises a fixing tab 16, including an orifice 17 and fastened at the corner between the longitudinal beam 6 and the rear beam 9 of the top frame 4. This fixing tab 16 is fastened using a screw 17a onto a fastening element 18 of the bottom frame 5.

The bottom frame 5 comprises a horizontal rectangular frame 5a comprising two longitudinal beams 19 and 20, a front transversal beam 21 and a rear transversal beam 22. The bottom frame 5 also comprises a rectangular mounting element 23, mounted perpendicularly on the front transversal beam 21. The mounting element 23 comprises two lateral uprights 24 and 25 and two longitudinal uprights 26 and 27.

The bottom frame 5 comprises two reinforcing arms 28 and 29 fastened by one of their ends, for example by welding, respectively onto the lateral uprights 24 and of the mounting element 23. The first reinforcing arm 28 is fastened by its other end onto the fastening means 18 of the bottom frame 5 and the second reinforcing arm 29 is fastened by its other end onto the longitudinal beam 20 of the horizontal frame 5a.

A first lifting arm 30 is positioned vertically on the longitudinal beam 20 of the horizontal frame 5a. A second lifting arm 31 is attached to the lateral upright 24 of the mounting element 23, thus forming a diagonal of the bottom frame 5 with the first lifting arm. This second arm is positioned vertically toward the outside of the bottom frame 5. The first lifting arm 30 is situated at two thirds of the longitudinal beam 20 of the frame 5a and the second lifting arm 31 is situated in the vicinity of the longitudinal beam 20 and the front transversal beam 21, thus forming a diagonal with the first lifting arm 30. Furthermore, these lifting arms 30 and 31 are situated on either side of the center of gravity of the propulsion assembly so as to facilitate the handling of the device.

The top frame 4 is fastened onto the bottom frame 5 via the four screws 10 and 17a cooperating with the four fastening elements 13, 14, 15 and 18 situated on the bottom frame 5.

The bottom frame 5 comprises a first fastening element fastened, for example by welding, onto the first lifting arm 30, said lifting arm 30 being positioned on the longitudinal beam 20 of the bottom frame 5. The bottom frame 5 comprises a second fastening element 14 fastened, for example by welding, onto a lateral upright 25 of the mounting element 23 of the bottom frame 5. The bottom frame 5 comprises a third fastening element 15 fastened, for example by welding, onto the first reinforcing arm 28 of the bottom frame 5. The bottom frame 5 comprises a fourth fastening element 18 fastened, for example by welding, onto the longitudinal beam 19 of the horizontal frame 5a of the bottom frame 5. These fastening elements 13, 14, 15 and 18 comprise tapped orifices 32 cooperating with the screws 10 and 17a for fastening the top frame 4 onto the bottom frame 5.

The bottom frame 5 is linked to the chassis by a first fastening means 33 and a second fastening means 34 respectively fastened onto the front and rear transversal beams 21 and 22 of the horizontal frame 5a. Preferably, these fastening means comprise elastic parts, such as parts made of rubber, making it possible to avoid the transmission of the vibrations from the electric machine 3 and other elements mounted in the mounting device to the chassis.

The parallelepipedal electronic power unit 2 comprises four fixing tabs 35 in the vicinity of its corners making it possible to fasten it to four of the corresponding fixing tabs 36 fastened in pairs inside the longitudinal beams 19 and 20 of the horizontal frame 5a. Four screws 37 pass through the orifices 38 of the fixing tabs 35 of the electronic power unit 2 and through the orifices 39 of the fixing tabs 36 of the bottom frame 5 and are tightened using a nut for example making it possible to fasten the electronic power unit 2 to the bottom frame 5.

The parallelepipedal electric machine 3, schematically represented in FIG. 1, is associated with a reduction gear 40. It comprises a tapped orifice 41 so as to allow for the tightening of a screw 42. The bottom frame 5 comprises a fixing tab 43 on the longitudinal beam 19 comprising an orifice 44 corresponding to the orifice 41 of the electric machine 3 making it possible, by tightening the screw 42, to create a means for fastening the electric machine 3 onto the bottom frame 5. The electric machine 3 also comprises at least one fastening element 45 complementing at least one fastening element 46 fastened under the longitudinal beam 19 of the bottom frame 5 representing another means for fastening the electric machine 3 onto the bottom frame 5. Other fastening means, not represented in FIG. 1, make it possible to complete the fastening of the electric machine 3 onto the bottom frame 5.

The bottom frame 5 can have all kinds of auxiliary elements easily fastened to it, such as the compressor, the vacuum pump or even the water pump, as well as other elements such as beam fastening members, not represented in FIG. 1, which remain attached to the chassis via the bottom frame 5.

Figure 2:
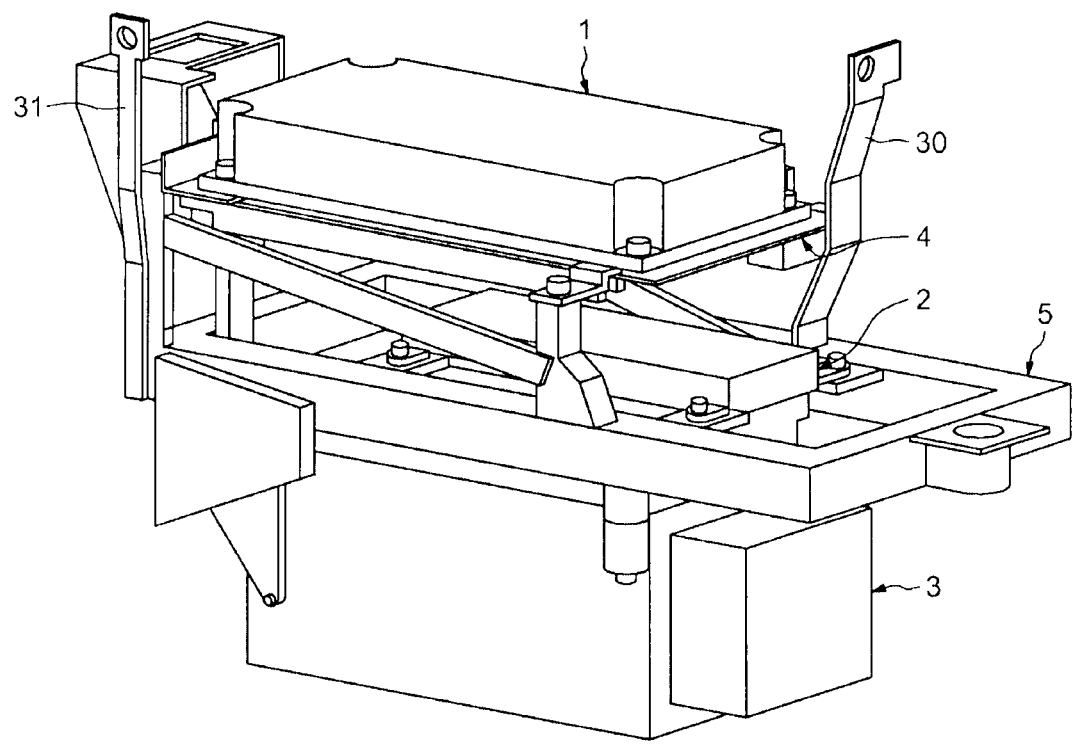
FIG. 2 illustrates an overview of a device according to the invention after assembly.

FIG. 2, in which the elements that are identical to those of FIG. 1 are given the same references, is a representation of the device described previously when the propulsion assembly comprising the charger block 1, the electronic power unit 2 and the electric machine are assembled with the mounting member comprising the top frame 4 and the bottom frame 5. The charger block 1 is fastened onto the top portion of the top frame 4. The electronic power unit 2 is fastened onto the bottom frame 5 and most of this electronic power unit 2 is located under the bottom frame 5. As for the electric machine 3, this is fastened to the underside of the bottom frame 5.

Via the two lifting arms 30 and 31 positioned balanced relative to the center of gravity of the propulsion assembly and the mounting member assembled, all these elements together can be assembled in one place then easily transported to another place with a view to mounting in the engine compartment of a motor vehicle.

Figure 3:
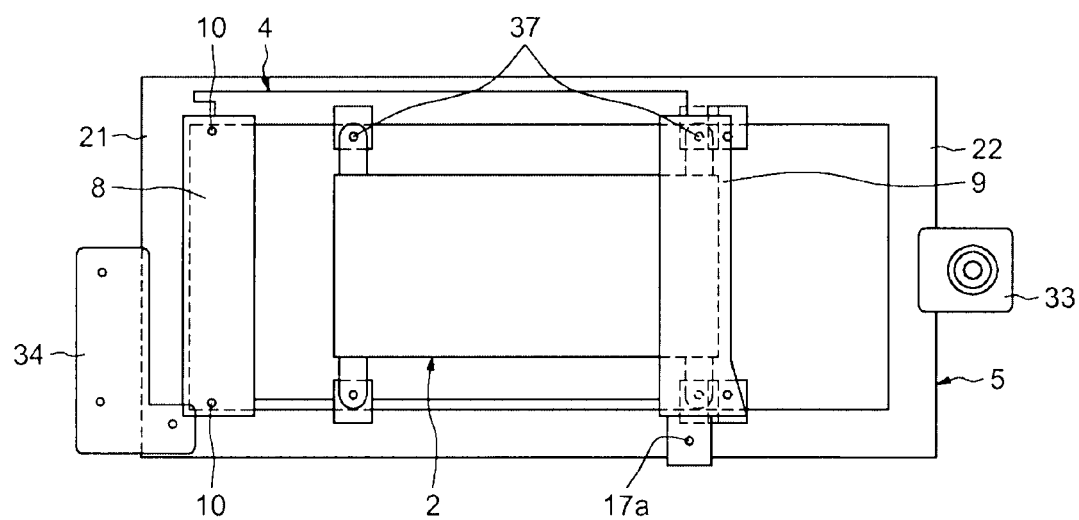
FIG. 3 illustrates a plan view of a device according to the invention during assembly.

FIG. 3, in which the elements that are identical to those of FIG. 1 are given the same references, is a plan view of the device according to the invention during assembly. The top frame 4 is already fastened onto the bottom frame 5 by the screws 10 and 17a and the bottom frame 5 is here already fastened to the chassis of the vehicle via the fastening means 33 and 34. The electronic power unit 2 is already fastened onto the bottom frame 5 via the screws 37.

The mounting member of the device comprises two distinct frames, a bottom frame 5 and a top frame 4, in order to overcome the lack of space in the engine compartment, which is such that the front and rear beams 8 and 9 of the top frame 4 have to be recentered. Thus, the front beam 8 of the top frame 4 is attached to the front beam 21 of the bottom frame 5 and the rear beam 9 of the top frame 4 is situated at a distance from the rear beam 22 of the bottom frame 5, blocking access to the rear fastening screws 37 fastening the electronic power unit to the bottom frame 5. When the top frame 4 is not dismantled, access to the rear fastening screw 37 of the electronic power unit 2 is masked. Now, the significance of the weight of the electronic power unit requires upward displacement for mounting and dismantling. This is made possible only when the top frame 4 is dismantled.

There now follows a description of the various steps in mounting an electric propulsion assembly on the mounting member described previously with reference to FIGS. 1 and 3. The first step is to fasten the bottom frame 5 onto the electric machine 3, the electronic power block 2 is then fastened onto the bottom frame 5, the top frame 4 is fastened onto the bottom frame 5 and finally the charger block is fastened to the top frame 4.

It is also possible to begin by fastening the charger block to the top frame 4, then fastening the electronic power unit 2 to the bottom frame 5. The top frame 4 is then fastened to the bottom frame 5 and the electric machine is fastened to the bottom frame 5. The bottom frame 5 is then fastened to the chassis of the motor vehicle.

When the assembly is mounted, as represented in FIG. 2, it can be handled and positioned, by supporting it using the two lifting arms 30 and 31 in order to lower it into the engine compartment of the vehicle and fasten it to the chassis of the vehicle via the bottom frame 5.

It is thus possible to easily and individually dismantle, for servicing or repair for example, the charger block 1 and the electronic power unit 2. It is also possible to dismantle or have access to the charger block 1, to the electronic power unit 2 and to the electric machine by removing only the top frame 4 without having to dismantle the bottom frame 5. Thus, the auxiliary elements, such as the compressor, the vacuum pump, the water pump, can remain in place in the engine compartment of the vehicle when dismantling the electric engine assembly.

It should be noted that, if the architectural constraints of the engine compartment permit, a mounting member comprising only a single portion could be used instead of two separate, bottom and top, frames.

Furthermore, the frames of the mounting device are preferably made of mechanically welded steel, which has the advantage of making the mounting device more resistant to impacts: in practice, in the event of an impact, the mounting device will be deformed without breaking. It should also be noted that the arrangement of the propulsion elements in this mounting device, which also makes it possible to fasten connector or cable protectors, makes these propulsion elements less vulnerable to the impacts than if they were fastened in the usual manner in the compartments more directly fastened to the chassis.

The invention claimed is:

1. A device for mounting an electric propulsion assembly, including an electric machine, an electronic power block, and a charger block, in an engine compartment of an electric vehicle, comprising:
  a mounting member including
    a bottom securing module including means for fastening to a chassis of the vehicle, means for fastening the electric machine, and means for fastening the electronic power block; and
    a top securing module configured to be fastened onto the bottom securing module, and including means for fastening the charger block,
  wherein the bottom securing module comprises lifting arms arranged on either side of a center of gravity of the mounting device.

2. The mounting device as claimed in claim 1, wherein the bottom securing module comprises a first transversal beam and a second transversal beam, the top securing module comprises a first beam and a second beam, and the top securing module and the bottom securing module are configured to be fastened such that the first beam of the top securing module is attached to the first transversal beam of the bottom securing module and the second beam of the top securing module is situated at a distance from the second transversal beam of the bottom securing module.

3. The mounting device as claimed in claim 2, wherein the means for fastening to the chassis include elastic parts fastened onto the first and second transversal beams.

4. The mounting device as claimed in claim 2, wherein the means for fastening the charger block include orifices in the first and second beams.

5. The mounting device as claimed in claim 4, wherein the bottom securing module includes a plurality of fastening elements configured to receive screws that pass through orifices in the charger block and the orifices in the first and second beams of the top securing module to fasten the charger block onto the top securing module.

6. The mounting device as claimed in claim 2, wherein the bottom securing module includes
  a rectangular mounting element mounted perpendicularly on the first transversal beam, the rectangular mounting element including a first fastening element mounted thereto; and
  a first reinforcing arm extending from the rectangular mounting element, the first reinforcing arm including a second fastening element mounted thereto,
  wherein the first and second fastening elements are configured to receive screws passing through orifices in the first beam of the top securing module to attach the first beam of the top securing module to the first transversal beam of the bottom securing module.

7. The mounting device as claimed in claim 6, wherein
  the lifting arms of the bottom securing module include a first lifting arm positioned on a first longitudinal beam of the bottom securing module, the first lifting arm including a third fastening element mounted thereto;
  the bottom securing module includes a fourth fastening element fastened onto a second longitudinal beam of the bottom securing module, and
  the third and fourth fastening elements are configured to receive screws passing through orifices in the second beam of the top securing module to attach the second beam of the top securing module to the bottom securing module at the distance from the second transversal beam of the bottom securing module.

8. The mounting device as claimed in claim 1, further comprising:
  means for fastening auxiliary elements of an engine of the motor vehicle to the bottom securing module.

9. The mounting device as claimed in claim 8, wherein the auxiliary elements of the engine include a compressor or a water pump.

10. The mounting device as claimed in claim 1, wherein the means for fastening the electric machine include a fixing tab and at least one fastening element extending from a longitudinal beam of the bottom securing module.

11. The mounting device as claimed in claim 1, wherein the means for fastening the electronic power block include a plurality of fixing tabs fastened to inside faces of longitudinal beams of the bottom securing module.

12. An electric propulsion assembly, intended to be mounted in an engine compartment of an electric vehicle, comprising:
  an electric machine;
  an electronic power block;
  a charger block; and
  a mounting member including a bottom securing module including means for fastening to a chassis of the vehicle, means for fastening the electric machine, and means for fastening the electronic power block; and a top securing module configured to be fastened onto the bottom securing module, and including means for fastening the charger block, wherein the bottom securing module comprises lifting arms arranged on either side of a center of gravity of the electric propulsion assembly.

13. The mounting propulsion assembly as claimed in claim 12, wherein the bottom securing module includes a first transversal beam and a second transversal beam, the top securing module includes a first beam and a second beam, and the top securing module and the bottom securing module are configured to be fastened such that the first beam of the top securing module is attached to the first transversal beam of the bottom securing module and the second beam of the top securing module is situated at a distance from the second transversal beam of the bottom securing module.

14. A method for mounting an electric propulsion assembly in an engine compartment of an electric vehicle, comprising:

fastening an electric machine onto a bottom portion of a bottom securing module;

fastening an electronic power block onto a top portion of the bottom securing module;

fastening a charger block onto a top securing module; and fastening the top securing module onto the bottom securing module, wherein the bottom securing module comprises lifting arms arranged on either side of a center of gravity of the electric propulsion assembly.

15. The mounting method as claimed in claim 14, further comprising:

fastening the bottom securing module to a chassis of the vehicle.

16. The mounting method as claimed in claim 14, further comprising:

fastening auxiliary elements of an engine of the motor vehicle to the bottom securing module.

17. The mounting method as claimed in claim 16, wherein the auxiliary elements of the engine include a compressor or a water pump.

18. The mounting method as claimed in claim 14, wherein the fastening the top securing module onto the bottom securing module includes attaching a first beam of the top securing module to a first transversal beam of the bottom securing module and a second beam of the top securing module is situated at a distance from a second transversal beam of the bottom securing module.

* * * * *